United States Patent [19]
Kakizawa

[11] Patent Number: 5,844,066
[45] Date of Patent: *Dec. 1, 1998

[54] PROCESS FOR THE PREPARATION OF LACTIC ACID-BASED POLYESTER

[75] Inventor: Yasutoshi Kakizawa, Chiba, Japan

[73] Assignee: Dainippon Ink and Chemicals, Inc., Tokyo, Japan

[*] Notice: The term of this patent shall not extend beyond the expiration date of Pat. No. 5,686,540.

[21] Appl. No.: 712,994

[22] Filed: Sep. 10, 1996

[30] Foreign Application Priority Data

Sep. 11, 1995 [JP] Japan ................................ 7-232604

[51] Int. Cl.$^6$ ............................ C08G 63/08; C08F 20/00
[52] U.S. Cl. ...................... 528/354; 528/272; 528/361; 528/362; 528/363; 528/486; 528/487; 528/492; 528/493; 528/494; 528/495
[58] Field of Search .................................. 528/361, 272, 528/354, 486, 487, 492, 493, 494, 495, 360, 363

[56] References Cited

U.S. PATENT DOCUMENTS

| | | | |
|---|---|---|---|
| 5,338,822 | 8/1994 | Gruber et al. | 528/361 |
| 5,585,191 | 12/1996 | Gruber et al. | 528/361 |
| 5,593,778 | 1/1997 | Kondo et al. | 528/361 |
| 5,686,540 | 11/1997 | Kakizawa | 528/356 |

*Primary Examiner*—Vasu Jagannathan
*Assistant Examiner*—Olga Asinovsky
*Attorney, Agent, or Firm*—Armstrong, Westerman, Hattori, McLeland & Naughton

[57] ABSTRACT

The present invention provides a process for the preparation of a lactic acid-based polyester having an excellent moldability, storage stability and biodegradability which has a less residual lactide left therein and is less susceptible to decomposition of lactic acid-based polyester and attachment of sublimed lactide to the molding apparatus, etc. at the devolatilization step and molding step after the polymerization reaction of lactic acid-based polyester. In the present invention, an organic chelating agent is added to a lactic acid-based polyester to deactivate the esterification catalyst used in the preparation of the lactic acid-based polyester, making it possible to inhibit the decomposition of lactic acid-based polyester at the devolatilizing process and molding process after polymerization reaction. Accordingly, a process for the preparation of a lactic acid-based polyester useful as a packaging material such as film and sheet having a high molecular weight, a high heat resistance, good mechanical properties and excellent moldability, storage stability and biodegradability can be provided.

22 Claims, No Drawings

PROCESS FOR THE PREPARATION OF LACTIC ACID-BASED POLYESTER

FIELD OF THE INVENTION

The present invention relates to a process for the preparation of a lactic acid-based polyester having a less residual volatile component, particularly a less residual lactide left therein, and an excellent thermal stability. More particularly, the present invention relates to a process for the preparation of a lactic acid-based polyester having a less residual lactide which is less susceptible to decomposition of lactic acid-based polyester and attachment of sublimed residual lactide to the apparatus, molded articles, etc. at the devolatilization step, molding step, etc.

BACKGROUND OF THE INVENTION

In recent years, plastics have found wide application in many fields because of its light weight and excellent durability and moldability. On the other hand, plastics are bulky and little decompose in natural environment. Thus, plastics accumulate in natural environment to cause a global pollution problem. They overflow dumping grounds and pollute the soil and ocean.

As a countermeasure of inhibiting the environmental pollution there has been keenly desired the development of biodegradable polymers which can decompose with microorganisms in the soil and water and then get into a material chain system in natural environment to inhibit the environmental pollution. For example, extensive studies have been made of the use of organism-absorbing lactic acid-based polyesters, which have found wide application as stitching fibers, etc., as a general-purpose polymer. Many studies and patent application have been made on the process for the preparation of such a lactic acid-based polyester.

However, most conventional polylactic acids as lactic acid or lactide polymers or copolymers of lactide with other components have a large residual lactide content and thus leave something to be desired in moldability and heat resistance. Accordingly, these conventional polylactic acids or copolymers are disadvantageous in that they decompose too fast to find application as general-purpose polymers, except for special application. It has been keenly desired to properly inhibit the decomposition of these polymers and enhance the storage stability of these polymers.

In particular, these polymers are subject to drop of molecular weight due to heat during molding. The resulting molded articles cannot attain sufficient physical properties. Further, lactide and other foreign matters are attached to the molding apparatus or molded articles, causing some troubles on the molding apparatus. This is probably because lactides left during polymerization and reproduced during molding decompose with water content in the atmosphere to produce an organic acid which then breaks the polymer chain. It has been thus desired to develop a polymer having a less residual lactide content.

Referring to the process for the removal Of lactide from polylactic acid or lactic acid copolymer, a process which comprises extracting lactide with a solvent and a solvent which comprises dissolving a polymer in a good solvent, and then allowing the polymer to be precipitated in a poor solvent have been conducted on a laboratory basis. On an industrial basis, a method using a biaxial extruder is disclosed in EP 532154. JP-A-5-93050 (The term "JP-A" as used herein means an "unexamined published Japanese patent application") discloses a method which comprises the removal of a volatile component in a pot under reduced pressure.

However, these methods are apt to the reproduction of lactide even if lactide is removed under reduced pressure at an elevated temperature. Thus, lactide in the polymer cannot be easily eliminated. This is because the catalyst used in polymerization also acts as a catalyst for the reaction of production of lactide from the polymer chain.

JP-A-6-116381 discloses a method for the removal of a catalyst from a pol.ylactic acid prepared from lactic acid in the presence of a solvent. This method comprises the removal of a catalyst from a polylactic acid in the presence of a large amount of a solvent. In some detail, an organic hydrophilic solvent and a weak acid are added to a polylactic acid dissolved in a solvent to remove a catalyst component from the system. The polylactic acid is deposited in powder, granular, particulate, flake or block form. The bulk density of the product is relatively high as 0.6 g/ml. Further, this procedure requires a relatively long time. Further, the resulting waste solvent containing a complex mixture requires a complicated disposal. Thus, this method is also industrially unsuitable. Moreover, this method is disadvantageous in that if the solvent is used in a small amount, the catalyst cannot be thoroughly removed.

On the other hand, JP-A-62-25121 discloses that a phosphoric acid such as phosphoric acid, phosphorous acid, pyrophosphoric acid and polyphosphoric acid or a phosphoric acid ester such as phosphoric acid triester, phosphoric acid phenyl, phosphorous acid triphenyl and triphenyl phosphine can be added to the reaction system during polycondensation of lactic acid to add to the molecular weight of the resulting polylactic acid and prevent the resulting polylactic acid from being colored.

However, phosphoric acids are disadvantageous in that they are hygroscopic and hydrolyzable and thus cannot thoroughly deactivate the catalyst used. Thus, lactide is reproduced during the devolatilizing process or molding process. Further, the resulting polymer shows deteriorated thermal stability and heat resistance and an increased corrosiveness. Moreover, the use of phosphoric acids can inhibit the coloring but exerts no effect of deactivating the catalyst used.

SUMMARY OF THE INVENTION

It is therefore an object of the present invention to provide a process for the preparation of a lactic acid-based polyester having an excellent moldability, storage stability and biodegradability which has a less residual lactide left therein and is less susceptible to decomposition of lactic acid-based polyester and attachment of sublimed lactide to the molding apparatus, etc. at the devolatilization step and molding step after the polymerization reaction of lactic acid-based polyester.

The foregoing object of the present invention will become more apparent from the following detailed description and examples.

The inventors made extensive studies of the solution to the foregoing problem. As a result, it was found that the kneading of a lactic acid-based polyester with an organic chelating agent inhibits the break of the lactic acid-based polyester chain, making it possible to produce a lactic acid-based polyester excellent in thermal stability and storage stability. Thus, the present invention has been worked out.

The present invention concerns a process for the preparation of a lactic acid-based polyester having a less residual lactide and an excellent thermal stability which comprises melt-kneading a lactic acid-based polyester with an organic chelating agent and more particularly a process for the preparation of a lactic acid-based polyester which comprises the incorporation of an organic chelating agent in a lactic acid-based polyester in an amount of from 0.001 to 5 parts by weight based on 100 parts by weight of the lactic acid-based polyester.

The present invention also concerns the foregoing process for the preparation of a lactic acid-based polyester, wherein the lactic acid-based polyester used is a polylactic acid or comprises a lactic acid component and a polyester consisting of a dicarboxylic acid component and a diol component in a weight proportion of from 99/1 to 10/90. The present invention further concerns the foregoing process for the preparation of a lactic acid-based polyester, wherein the polyester consisting of a dicarboxylic acid component and a diol component which constitutes the lactic acid-based polyester is an aliphatic polyester.

The present invention also concerns the foregoing process for the preparation of a lactic acid-based polyester which comprises melt-kneading a lactic acid-based polyester with an organic chelating agent, and then removing the volatile component by devolatilization under reduced pressure. The present invention further concerns a process for the molding of a lactic acid-based polyester which comprises adding an organic chelating agent to a lactic acid-based polyester, and then molding the mixture. In particular, the present invention concerns the foregoing process for the molding of a lactic acid-based polyester, wherein the organic chelating agent is used in an amount of from 0.001 to 5 parts by weight based on 100 parts by weight of the lactic acid-based polyester used.

More particularly, the present invention concerns a process for the preparation of a lactic acid-based polyester having a less residual lactide, which process comprises removing the residual lactide from a lactic acid-based polyester obtained by polymerization or the like at a temperature of from 130° C. to 25° C. and a pressure of from 0.01 to 50 torr using a vessel type devolatilizer, thin film type devolatilizer or vented extruder, particularly biaxial extruder.

DETAILED DESCRIPTION OF THE INVENTION

The present invention will be further described hereinafter.

The organic chelating agent employable herein is not specifically limited. Examples of the organic chelating agent include amino acids, phenols, hydroxycarboxylic acids, diketones, amines, oximes, phenathrolines, pyridine compounds, dithio compounds, phenols including coordinated atom N, carboxylic acids including coordinated atom N, diazo compounds, thiols, and porphyrins.

These organic chelating agents form a complex with a catalyst used in the preparation of a lactic acid-based polyester to deactivate the catalyst activity.

Specific examples of the amino acids include glycine, leucine, alanine, serine, α-aminobutyric acid, acetylaminoacetic acid, glycyl glycine, and glutamic acid.

Specific examples of the phenols include alizarin, t-butylisopropyltroboron, chromotropic acid, tiron, oxyne, and t-butyl catechol.

Specific examples of the hydroxycarboxylic acids include tartaric acid, oxalic acid, citric acid, monooctyl citrate, dibenzoyl-D-tartaric acid, and di-p-toluoyl-D-tartaric acid. Specific examples of the diketones include acetylacetone, hexafluoroacetylacetone, benzoylacetone, thenoyltrifluoroacetone, and trifluoroacetone.

Specific examples of the amines include ethylenediamine, diethylenetriamine, 1,2,3-triaminopropane, thiodiethylamine, triethyltetramine, triethanolamine, tetraethylenepentamine, and pentaethylenehexamine.

Specific examples of the oximes include dimethylglyoxime, α,α-furyldioxime, and salicylaldooxime. Specific examples of the phenathrolines include neocuproine, and 1,10-phenanthroline.

Specific examples of the pyridine compounds include 2,2-bipyridine and 2,2',2"-terpyridyl. Specific examples of the dithio compounds include xanthogenic acid, diethyldithiocarbamic acid, and toluene-3,4-dithiol. Specific examples of the phenols including coordinated atom N include o-aminophenol, oxine, nitroso-R salt, 2-nitroso-5dimethylaminophenol, 1-nitro-2-naphthol, and 8selenoquinoline.

Specific examples of the carboxylic acids including coordinated atom N include quinaldinic acid, nitrilotriacetic acid, ethylenediaminediacetic acid, hydroxyethyethylenediaminetriacetic acid, ethylenediaminetetraacetic acid, transcyclohexanediaminetetraacetic acid, diethylenetriaminepentaacetic acid, triethylenetetraminehexaacetic acid, anilinediacetic acid, 2-sulfoanilinediacetic acid, 3-sulfoanilinediaceti.c acid, 4-sulfoanilinediacetic acid, 2-aminobenzoic acid-N,N-diacetic acid chelate, 3-aminobenzoic acid-N,N-diacetic acid chelate, 4-aminobenzoic acid-N,N-diacetic acid chelate, methylaminediacetic acid, β-alanine-N,N-diacetic acid chelate, β-aminoethylsulfonic acid-N,N-diacetic acid chelate, and β-aminoethylphosphonic acid-N,N-diacetic acid chelate.

Specific examples of the diazo compounds include diphenylcarbazone, magneson, dithizone, eriochrome black T, 4-(2-thiazoylazo)resorcin, and 1-(2-pyridylazo)-2-naphthol.

Specific examples of the thiols include thioxine, thionalide, 1,1-trifluoro-4-(2-thenyl)-4-mercapto-3-butene-2-one, and 3-mercapto-p-cresol.

Specific examples of the porphyrins include tetraphenylporphyrin, tetrakis(4-N-methylpyridyl)porphine, cupferron, murexide, polyethyleneimine, polymethylacryloylacetone, polyacrilic acid, and mixture thereof.

Among these organic chelating agents, those which makes an efficient coordinated bonding to metal ions in the catalyst to inhibit the break of the polymer chain are carboxylic acid including coordinated atom N such as nitrilotriacetic acid, ethylenediaminediacetic acid, tetraethylenepentamine, hydroxyethylenediaminetriacetic acid, ethylenediaminetetraacetic acid, transcyclohexanediaminetetraacetic acid, diethylenetriaminepentaacetic acid and triethylenetetraminehexaacetic acid, and hydroxycarboxylic acid such as tartaric acid, dibenzoyl-D-tartaric acid, di-p-toluoyl-D-tartaric acid, citric acid and monooctyl citrate. In particular, the foregoing carboxylic acid including coordinated atom N has an excellent thermal stability and storage stability. The foregoing hydroxycarboxylic acid colors the lactic acid-based polyester little.

Examples of the lactic acid-based polyester employable herein include polylactic acid obtained by the condensation of lactic acid by dehydration under reduced pressure in the presence or absence of solvent, copolymer of lactic acid with other hydroxycarboxylic acids, polylactic acid obtained by the ring opening polymerization of lactide as a cyclic dimer of lactic acid, copolymer of lactide with other cyclic esters, and copolymer of these polymers with monomers or polymers having hydroxyl group copolymerizable therewith.

Lactic acid is a monomer having stereoisomerism. There are L-lactic acid and D-lactic acid. A polymer containing L-lactic acid or D-lactic acid alone can crystallize to attain a high melting point.

Examples of lactide as a dehydrated cyclic dimer of lactic acid include isomers such as D-lactide, L-lactide and meso-lactide. A polymer containing D-lactide or L-lactide alone can crystallize to attain a high melting point. The lactic acid-based polyester of the present invention can comprise the two lactic acids or the three lactides in combination to realize preferred polymer characteristics.

In the present invention, in order to attain a high heat resistance, the lactic acid component to be used preferably comprises L-lactic acid in a proportion of not less than 70% based on the total content of the lactic acid component. Further, in order to attain a high thermophysical properties, the lactic acid component to be used preferably comprises L-lactic acid in a proportion of not less than 80% based on the total content of the lactic acid component. In the case where lactide is used, too, the lactic acid component to be used preferably comprises L-lactide in a proportion of not less than 70% based on the total content of the lactic acid component to attain a high heat resistance. Further, in order to attain a high thermophysical properties, the lactic acid component to be used preferably comprises L-lactide in a proportion of not less than 80% based on the total content of the lactic acid component.

In the present invention, a polylactic acid may be used, of course. It has been known that a polylactic acid is normally transparent but lacks flexibility. A lactic acid-based polyester obtained by the copolymerization of a polyester consisting of a dicarboxylic acid component and a diol component with a lactic acid component which exhibits a higher flexibility and melting point can be used, too.

The molecular weight of the lactic acid-based polyester to be used in the present invention is preferably high. In some detail, the weight-average molecular weight of the lactic acid-based polyester is preferably from 10,000 to 250,000, more preferably from 20,000 to 250,000. The molar ratio of dicarboxylic acid component to diol component is preferably around 1.

The dicarboxylic acid component in the lactic acid-based polyester may be an aromatic dicarboxylic acid component. Specific examples of the aromatic dicarboxylic acid include phthalic acid, isophthalic acid, terephthalic acid, and 2,6-naphthalenedicarboxylic acid. Further, a $C_{4-20}$ aliphatic dicarboxylic acid component is preferably used. Specific examples of the $C_{4-20}$ aliphatic dicarboxylic acid include succinic acid, methylsuccinic acid, adipic acid, 2-methyladipic acid, methylglutaric acid, azelaic acid, sebacic acid, brassylic acid, dodecanedionic acid, cyclohexanedicarboxylic acid, maleic anhydride, fumaric acid, dimer acid, and mixture thereof.

The diol component in the polyester is not specifically limited in its kind. Specific examples of the diol include ethylene glycol, propylene glycol, 1,2-butylene glycol, 1,3-butylene glycol, 1,4-butylene glycol, 1,4-pentanediol, 1,5-pentanediol, 2,4-pentanediol, hexamethylene glycol, octanediol, neopentyl glycol, cyclohexanedimethanol, hydrogenated bisphenol A, xylene glycol, diethylene glycol, triethylene glycol, dipropylene glycol, tripropylene glycol, dibutanediol, 3-hydroxypivalyl pivalate ethylene glycol, and mixture thereof.

As the diol component, a polyoxyalkylenediol is particularly preferred for the enhancement of flexibility. Specific examples of the polyoxyalkylenediol include polyethylene glycol, polypropylene glycol, polybutylene glycol, polypentanediol, and polytetramethylene glycol.

As the dicarboxylic acid component and diol component constituting the polyester there may be preferably used an aliphatic dicarboxylic acid component and an aliphatic diol component to attain an excellent biodegradability and flexibility. Further, as the dicarboxylic acid component and diol component, those having branched chains tend to have an excellent transparency.

The weight proportion L/P of the lactic acid component (L) to the polyester component (P) in the lactic acid-based polyester obtained according to the present invention is preferably from 99/1 to 10/90. It is preferably from 99/1 to 40/60 to attain a glass transition point of not lower than room temperature or a melting point of not lower than 130° C. Further, it is preferably from 99/1 to 70/25 to attain a high transparency and a high stiffness. Moreover, it is preferably from 70/25 to 40/60 to attain a high transparency and a high flexibility.

The lactic acid-based polyester to be used herein preferably has a high molecular weight so that it can be molded in a wide temperature range. In some detail, the weight-average molecular weight of the lactic acid-based polyester is from 20,000 to 400,000. The lactic acid-based polyester having a molecular weight in this range can be molded into a sheet having a mechanical strength ranging from high strength to flexibility. In some detail, a sheet having a tensile elastic modulus of from 500 to 50,000 $kg/cm^2$ can be obtained.

The process for the preparation of the laclic acid-based polyester made of a lactic acid component and a polyester consisting of dicarboxylic acid component and diol component will be sequentially described. In some detail, a mixture of lactide and polyester is heated and melted or mixed with a solvent. To the mixture is then added an esterification catalyst. The reaction is preferably, effected at a temperature of not lower than the melting point of lactide to provide a homogeneous reaction system that gives a high polymerization rate.

The reaction temperature is preferably from not lower than the melting point of lactide to not higher than 200° C. from the standpoint of reaction equilibrium. In this range of reaction temperature, any decomposition reaction accompanying the coloring of the lactic acid-based polyester can be inhibited. The melting point of lactide is in the vicinity of 95° C. Therefore, the reaction temperature is from not lower than 95° C. to not higher than 200° C., preferably from not lower than 130° C. to not higher than 190° C. from the standpoint of reaction equilibrium. In this temperature range, any decomposition reaction accompanying the molecular weight drop or coloring of the lactic acid-based polyester can be inhibited.

In order to inhibit the decomposition or coloring of lactide, the atmosphere suitable for the reaction is preferably a dried inert gas. In particular, the reaction is preferably effected in an atmosphere of nitrogen or argon gas or with such an inert gas bubbled therethrough. It is necessary that the starting material such as lactide be previously freed of water content and dried.

During the preparation of the lactic acid-based polyester, the reaction solution increases in its viscosity. The resulting reaction heat or shearing heat in stirring causes a remarkable local heat generation, producing a lactic acid-based polyester with a deteriorated quality or a colored lactic acid-based polyester. In order to inhibit this defect, it is preferred that the reaction be effected with a solvent capable of dissolving lactide and polyester therein. Examples of the solvent employable herein include benzene, toluene, ethylbenzene, xylene, cyclohexanone, and isopropylether.

Examples of the esterification catalyst to be used in the preparation of the lactic acid-based polyester of the present invention include metal such as tin, zinc, lead, titanium, bismuth, zirconium, germanium and cobalt and compounds thereof, which are generally known as catalyst for ring opening polymerization of cyclic esters and ester exchange catalyst. In particular, the metal compound employable herein is preferably in the form of organic compound, carbonate or halide.

Specific examples of the metal compound include tin octanoate, tin chloride, zinc chloride, zinc acetate, lead oxide, lead carbonate, titanium chloride, diacetacetoxy oxytitanium, tetraethoxytitanium, tetrapropoxytitanium, tetrabutoxytitanium, germanium oxide, and zirconiunium oxide. The amount of the metal compound to be used is preferably from 0.001 to 0.5 parts by weight, more preferably from 0.002 to 0.2 parts by weight based on 100 parts by weight of the reaction components.

For the preparation of the lactic acid-based polyester of the present invention, an ordinary reaction vessel may be used. In general, the reaction of a reaction solution having a viscosity as high as more than 10,000 poise produces a remarkable stirring heat caused by shearing force in stirring, not to mention polymerization heat. Thus, dynamic stirring causes a remarkable local heat generation in the stirred zone. Accordingly, in order to obtain a stable less colored lactic acid-based polyester, it is preferred that a static mixer which can provide uniform mixing at a small shearing force be used.

A static mixer is normally cylindrical. It comprises a linear combination of a plurality of static mixers. The starting material is continuously supplied into the static mixer through an intake port in an atmosphere of inert gas. In this arrangement, the reaction solution continuously moves through the interior of the static mixer so that the reaction procedure, including charging of starting material, reaction, devolatilization and pelletization of polymer, can continuously proceed without causing the reaction system to come into contact with the external atmosphere.

Besides the foregoing reaction system, continuous polymerization by continuous stirred reaction vessel., i.e., so-called CSTR (continuous stirred tank reactor), continuous polymerization by CSTR and a static mixer in combination, or continuous reaction by a biaxial extruder or the like can be effectively used. The preparation and molding of the lactic acid-based polyester can be simultaneously effected by a reactive processing. In these reaction systems, the reaction, including charging of starting material, reaction, devolatilization and pelletization of polymer, can continuously proceed without causing the reaction system to come into contact with the external atmosphere.

The organic chelating agent is preferably added to the reaction system after the completion of the polymerization process. If the organic chelating agent is added during the polymerization process, the catalyst loses its activity, causing the reaction to be terminated in the course of the process and hence leaving a large amount of unreacted components behind. In some detail, the organic chelating agent can be added to the reaction system at the time when the percent conversion of a monomer Such as lactide to a polymer is preferably from 80% to 99%, more preferably from 90% to 99% taking into account the efficiency of the devolatilization process. The use of such an organic chelating agent can minimize the break of polymer chains.

The amount of the organic chelating agent to be used depends on the kind of the catalyst used and the reaction conditions. The organic chelating agent is preferably added to reaction product before the withdrawal of the polymer thus obtained in an amount of from 0.001 to 5 parts by weight based on the weight of the reaction product or from 0.1 to 100 parts by weight based on 1 part by weight of the catalyst used. The chelation of the organic chelating agent with the catalyst greatly depends on how the reaction system is stirred. In general, it is completed in from 5 to 30 minutes, normally about 3 minutes. The reaction temperature is preferably from 130° C. to 200° C.

Referring to the time at which the organic chelating agent is added to the reaction system, the organic chelating agent is preferably added after the completion of the polymerization reaction, followed by stirring and taking out from the reaction system, in a batch polymerization. Alternatively, the take-out line may be provided with an addition line at which the organic chelating agent can be added or taken outn. In the case of continuous polymerization by a static mixer and CSTR, singly or in combination, or continuous reaction by a biaxial extruder, an organic chelating agent addition line at which the organic chelating agent can be added or taken out may be provided after the reaction completion point.

In the case where a batch polymerization or continuous polymerization is not employed, e.g., a solvent is used in the polymerization and removed after the polymerization or in the case where a devolatilization apparatus for removing unreacted components or malodorous components after the polymerization process is used, the organic chelating agent is preferably added after the completion of the polymerization reaction before the devolatilizing apparatus to inhibit the decomposition of polymer chains and hence inhibit the generation of volatile components, enhancing the efficiency of devolatilization. In the case where a devolatilizing apparatus for removing a solvent and a devolatilizing apparatus for removing a monomer component are separately provided, the organic chelating agent may be added before either of the two devolatilizing apparatus.

Besides the foregoing addition processes, the organic chelating agent may be added to the lactic acid-based polyester in granulated form. In other words, the granulated lactic acid-based polyester may be sprinkled, coated or mixed with the organic chelating agent. Alternatively, the lactic acid-based polyester granulated form, i.e., so-called pelletized form, may be mixed with an organic chelating agent so that it can undergo reaction during molding, optionally with devolatilization. The organic chelating agent may be added when the lactic acid-based polyester is re-pelletized with a filler or pigment. The extruder or injection molding machine for molding the lactic acid-based polyester may be provided with an addition line at which the organic chelating agent can be added.

In the case where the lactic acid-based polyester is prepared by condensation in the presence of an organic solvent under reduced pressure, the organic chelating agent may be added in the presence of the organic solvent after the completion of polymerization or may be added after the removal of the solvent and the isolation of the polymer component. Alternatively, the organic chelating agent may be used for the deactivation of an extremely small amount of the catalyst which has been left after the removal of the catalyst by a method disclosed in JP-A-6-116381. Further, the organic chelating agent may be added during re-pelletizing.

In the process for the preparation of the lactic acid-based polyester of the present invention, devolatilization is preferably effected under reduced pressure for the purpose of removing lactide or solvent left in the latter stage of polymerization and malodorous substances. This devolatilizing process can reduce the content of residual lactide, making it possible to remarkably increase the storage stability of the resulting lactic acid-based polyester. The residual lactide disadvantageously causes the deterioration of the heat resistance of the lactic acid-based polyester in the form of film or sheet. Further, the residual lactide causes the hydrolysis of the film or sheet due to water content attached. Moreover, the residual lactide causes the reduction of the molecular weight of the film or sheet. This causes the film or sheet to be fused to each other.

Further, the residual lactide in the film or sheet leaving the molding apparatus sublimes away to contaminate the film or sheet thus obtained. In order to inhibit this defect, the content of residual lactide in the lactic acid-based polyester of the present invention is preferably not more than 1% by weight, more preferably not more than 0.1% by weight.

In some detail, the devolatilization process is preferably effected by taking out the polymerization product under reduced pressure at an elevated temperature. In order to inhibit the reduction of the molecular weight of the lactic acid-based polyester, devolatilization is preferably effected at a temperature of from 130° C. to 250° C. under a pressure of from 0.1 to 50 torr for 0.5 to 30 minutes. As another devolatilizing method there may be used a method which comprises pelletizing or crushing the lactic acid-based polyester obtained by polymerization, and then taking out the product under reduced pressure at an elevated temperature. In this case, too, devolatilization is preferably effected at a temperature of from 60° C. to 250° C. under a pressure of from 0.1 to 50 torr for 5 to 400 minutes for the purpose of inhibiting the reduction of the molecular weight of the lactic acid-based polyester.

The apparatus for use in the removal and elimination of lactide is not specifically limited. The lactic acid-based polyester in the molten, solid or particulate form may be placed under a pressure of not more than 760 torr so that lactide, solvent and malodorous components can be removed. In some detail, a vessel type devolatilizer, thin film type devolatilizer or vented extruder, particularly biaxial extruder, capable of continuously devolatilizing molten, solid or particulate lactic acid-based polyester is preferred and recommended.

Examples of the vessel type devolatilizer employable herein include those disclosed in JP-A-59-166506, JP-A-61-228012, and JP-A-2-209902. In some detail, the vessel type devolatilizer preferably comprises a vertical shell-and-tube heat exchanger and a devolatilizing tank. In this arrangement, the vertical shell-and-tube heat exchanger for heating the reaction solution taken out from the polymerization process is preferably provided on the devolatilizing tank so that the reaction solution which has passed through the heat exchanger immediately flows down through the devolatilizing tank while being foamed. Two of such an apparatus are preferably connected in a series combination of two units to provide an enhanced devolatilizing efficiency.

In some detail, devolatilizing is preferably effected at a temperature of from 130° C. to 250° C., more preferably from 150° C. to 220° C., under a pressure of from 0.1 to 50 torr, preferably from 0.1 to 30 torr, more preferably from 0.1 to 10 torr, for 0.5 to 30 minutes, preferably from 0.5 to 15 minutes, more preferably from 0.5 to 5 minutes, to inhibit the re-generation of lactide from the lactic acid-based polyester obtained by polymerization and hence the reduction of the molecular weight thereof.

The thin film type devolatilizer using a drastically reduced pressure, if used, is preferably equipped with a cylindrical external wall, an agitator blade provided thereinside for pressing a liquid material against the wall surface and a mechanism provided in the lower zone for taking out the reaction solution processed out of the apparatus. The apparatus may be in a horizontal or vertical cylindrical form. In the case where a high viscosity reaction solution such as lactic acid-based polyester of the present invention is treated, the vertical type apparatus is preferably used because the reaction solution can be discharged by gravity.

Referring to the aspect ratio of the cylindrical body portion of the vertical thin film type devolatilizer, the vertical length is preferably longer than the width of the cylinder to put a small torque on the agitator blade and hence attain a great devolatilizing area for unit volume. The agitator blade for pressing a liquid material against the wall surface plays an important role in obtaining an effective devolatilizing surface area. The agitator blade needs to have two or more screws. Either a blade for deviding such as paddle blade or an integrated type blade such as helical blade may be used.

The clearance between the blade and the wall surface determines the retention time of the liquid material. If the clearance is small, a liquid film having a good surface efficiency can be formed but the material is subject to a great shearing force. Thus, the clearance should be well balanced.

Referring to the mechanism provided in the lower zone for taking out the reaction solution processed, the reaction solution can be taken out by gravity. Alternatively, the reaction solution can be dynamically withdrawn by the action of a screw blade or the like or discharged by a gear pump. This dynamic method enables a stable withdrawal of the reaction solution.

In the thin film type devolatilizer, the volatile component is removed from the reaction solution under reduced pressure. In order to prevent the volatile component from being deposited on the agitator blade or in the pipe under pressure, it is necessary that the agitator blade and the pipe be kept warm. Examples of the method for reducing the pressure in the thin film type devolatilizer include a method which comprises beginning the pressure reduction with the vicinity of the inlet of the reaction solution to be devolatilized, i.e., reducing the pressure in the direction opposite the flowing direction, and a method which comprises beginning the pressure reduction with the vicinity of the outlet of the reaction solution to be devolatilized, i.e., reducing the pressure in the forward direction. The direction of pressure reduction is not specifically limited. However, in the case where a high viscosity reaction solution is devolatilized, the pressure reduction is preferably effected in the backward direction to minimize the contamination of the pipe in the reduced pressure system.

Referring to the devolatilizing process in the thin film type devolatilizer, the polymerization product is preferably treated under reduced pressure at an elevated temperature. In order to inhibit the re-generation of lactide from the lactic acid-based polyester polymerized and hence provide an effective devolatilization without reducing the molecular weight thereof, the devolatilization is preferably effected at a temperature of from 130° C. to 250° C., more preferably from 150° C. to 220° C., under a pressure of from 0.1 to 50 torr, preferably from 0.1 to 30 torr, for from 0.5 to 30 minutes, preferably from 0.5 to 15 minutes, more preferably from 0.5 to 5 minutes.

The devolatilizing surface area is a great factor determining the devolatilizing capacity. For example, 100 kg of a polymer is preferably devolatilized at a surface area of about 1 m$^3$. The more the rotary speed of the agitator blade is, the more rapidly can be conducted surface renewal. However, the polymer is more subject to shearing stress. It is thus necessary that a proper rotary speed be considered for each polymer.

The biaxial extruder has been originally used in the kneading of a polymer with an additive or the molding of a polymer. In recent years, however, a biaxial extruder equipped with a vent through which an offensive smell or foreign matters can be removed has been widely put into practical use. Further, this type of an extruder can be used to remove the volatile component from the polymer.

The cylinder plays an important role in obtaining an effective devolatilizing surface area. The shape of the cylinder should be considered such that the polymer is prevented from flowing into the reduced pressure system together with the volatile component (so-called venting up) when the volatile component is removed by evacuating air from the system through the vent. Further, the cylinder should be properly combined with a screw. If necessary, one or more vents should be provided.

The opening area is preferably large. However, it should be considered that the foregoing venting-up be prevented. Further, the biaxial extruder can be equipped with a line at which an additive, particularly an organic chelating agent disclosed herein, can be added in the course of the process.

The screw plays an important role in obtaining an effective devolatilizing surface area. Two or more screws are required. For the purpose of sealing the vent, the opening of the vent preferably has a Dulmage or ring-shaped sealing mechanism. In order to provide the interior of the biaxial extruder with a line at which an additive, particularly an organic chelating agent disclosed herein, can be added in the course of the process, it is preferred that the extruder be partly equipped with a kneading screw having a high kneading effect.

In the biaxial extruder, the two screws rotate in the same direction or different directions. If the two screws rotate in the same direction, they can fully engage with each other, providing excellent axis self-cleaning properties. If the two screws rotate in different directions, one of the two screws can rotate in the direction opening to the opening of the vent and the other can rotate in the direction closing to the opening of the vent, providing a wide effective devolatilizing area. Many polymers are processed by a biaxial extruder in which two screws rotate in different directions. However, if the two screws rotate in different directions, the polymer is more subject to shearing that can contribute to the break of the polymer chains. Accordingly, a biaxial extruder having two screws rotating in the same direction is preferred in the present invention.

In the vent of the biaxial extruder, the volatile component is removed from the reaction solution under reduced pressure. In order to prevent the volatile component from being deposited in the opening of the vent or in the pipe under pressure, it is necessary that the opening of the vent and the pipe in which the air within has been evacuated be kept warm. In some detail, the residual lactide is preferably removed from the lactic acid-based polyester polymerized at a temperature of from 130° C. to 250° C. under a pressure of from 0.01 to 50 torr.

Other examples of the method for eliminating the residual lactide include a reprecipitation method Which comprises dissolving the lactic acid-based polyester in a solvent after the completion of the polymerization reaction, and then adding the solution to a poor solvent to obtain a desired polymer. Examples of the solvent for dissolving the lactic acid-based polyester therein include benzene, toluene, ethylbenzene, xylene, cylohexanone, methyl ethyl ketone, methyl isobutyl ketone, tetrahydrofuran, dioxane, isopropylether, dichloromethane, chloroform, carbon tetrachloride, chlorobenzene, dichlorobenzene, trichlorobenzene, chloronaphthalene, and mixture thereof. These solvents have a good dissolving power. Examples of the poor solvent include water, methanol, ethanol, propanol, butanol, pentane, hexane, heptane, octane, nonane, decane, diethylether, and mixture thereof.

The reprecipitation process is preferably effected by a process which comprises dissolving the lactic acid-based polyester in a solvent at a concentration of from 2 to 20% by weight at room temperature or an elevated temperature, gradually adding the solution to a poor solvent in an amount of twice to 15 times that of the solution with stirring, and then allowing the solution to stand for 10 to 180 minutes to effect precipitation. The residual solvent is then removed from the precipitate thus obtained under reduced pressure and/or heating. In accordance with this process for the removal of lactide, the content of residual lactide can be reduced from 2 to 5% to not more than 1.0%, optionally to not more than 0.1%.

As another method for eliminating the residual volatile component there may be used a solvent cleaning method which comprises adding the lactic acid-based polyester polymerized to a poor solvent for polymer capable of dissolving the volatile component therein to remove the volatile component from the polymer.

Examples of the solvent for cleaning the lactic acid-based polyester include propyl acetate, butyl acetate, methyl butyrate, ethyl butyrate, cyclohexanone, methyl ethyl ketone, methyl isobutyl ketone, isopropyl ether, methanol, ethanol, propanol, butanol, diethylether, and mixture thereof.

The cleaning process is preferably effected by a process which comprises adding the lactic acid-based polyester to the solvent in an amount of from 2 to 80% by weight based on the weight of the solvent at room temperature or under cooling or heating, cleaning the lactic acid-based polyester with stirring for 2 to 15 minutes, taking out the polymer thus precipitated, and then drying the polymer under reduced pressure and/or heating.

During the preparation of the lactic acid-based polyester of the present invention, components other than the lactic acid component and polyester may be further added. In particular, for the purpose of softening the lactic acid-based polyester, a hydroxycarboxylic acid component other than the cyclic ester and lactic acid may be added in an amount of from 1 to 40% by weight.

These additional components are specifically limited. Specific examples of these additional components include intramolecular cyclic ester of hydroxycarboxylic acid such as meso-lactide and glycolide, intramolecular cyclic ester of hydroxycarboxylic acid such as $\epsilon$-caprolactone, $\gamma$-valerolactone, $\gamma$-undecalactone and $\beta$-methyl-$\delta$-valeiolactone, hydroxycarboxylic acid such as glycolic acid, dimethylglycolic acid, $\beta$-hydroxypropanoic acid, $\alpha$-hydroxybutyric acid, $\beta$-hydroxybutyric acid, $\gamma$-hydroxybutyric acid, $\alpha$-hydroxyvaleric acid, $\delta$-hydroxymethylvaleric acid, $\alpha$hydroxycaproic acid, $\beta$-hydroxycaproic acid, $\gamma$-hydroxycaproic acid, $\delta$-hydroxycaproic acid, $\delta$-hydroxymethylcaproic acid, $\epsilon$-hydroxycaproic acid and $\epsilon$-hydroxymethylcaproic acid, and monomer and polymer having a hydroxyl group such as trimethylolpropane, pentaerythritol, polyethylene glycol, and polypropylene glycol. In general, when the content of cyclic ester, hydroxycarboxylic acid or monomer or polymer having a hydroxyl group is increased, it gives a tendency that the glass transition point and the melting point of the resulting lactic acid-based polyester are lowered, raising the flexibility thereof.

The preparation process according to the present invention can provide products ranging from a lactic acid-based polyester having a high stiffness to a lactic acid-based polyester having a high flexibility. The lactic acid-based polyester obtained according to the present invention has a high molecular weight and excellent heat resistance, thermal stability, moldability and storage stability. The lactic acid-based polyester of the present invention further has a tensile elastic modulus of from 500 to 50,000 kg/cm$^2$. Therefore, the lactic acid-based polyester of the present invention can be widely used as a packaging material such as sheet and film which is normally made of general-purpose polymer and various materials such as foaming material, extrusion molding material, injection molding material, blow molding material, material used for ink and material used for lamination.

The lactic acid-based polyester obtained according to the present invention has a good biodegradability. Therefore, when discarded after used as a packaging material, foaming material, extrusion molding material, injection molding material, material used for ink, material used for lamination or the like, the lactic acid-based polyester is subject to hydrolysis and biodegradation. In the sea water, the polymer shows a strength deterioration in several months to two years and undergoes decomposition to an extent such that its original shape is destroyed.

Further, the lactic acid-based polyester of the present invention has a less residual lactide and hence an excellent storage stability. Thus, the lactic acid-based polyester of the present invention is less subject to polymer decomposition during molding. Thus, the lactic acid-based polyester of the present invention has an excellent moldability.

Accordingly, the lactic acid-based polyester of the present invention can be molded by various methods such as extrusion molding, injection molding, blow molding, inflation molding, lamination forming and press molding using an existing apparatus used for general-purpose resin. The lactic acid-based polyester of the present invention is particularly useful as a packaging material.

Further, the lactic acid-based polyester of the present invention can be thoroughly plasticized as it is and thus can be easily molded. If it is desired to render the lactic acid-based polyester highly plastic, the lactic acid-based polyester may comprise a plasticizer such as dioctyl adipate, dioctyl sebacate, trioctyl trimellitate, diethyl phthalate, dioctyl phthalate, polypropylene glyco adipate and butanediol adipate incorporated therein. Particularly preferred among these plasticizers is an adipic acid-based polyester plasticizer because of its good compatibility and plasticizing effect. In particular, an adipic acid-based polyester plasticizer having a weight-average molecular weight of not more than 20,000 terminated by alcohol or the like is preferred because of its good moldability and stability during molding.

The amount of such a plasticizer to be used is not specifically limited. For the purpose of avoiding a phenomenon in which excess plasticizer is eluted from the polymer, i.e., bleeding, the plasticizer is preferably incorporated in an amount of from 1 to 40% based on the weight of the lactic acid-based polyester. The lactic acid-based polyester of the present invention may further comprise a metallic soap such as zinc stearate, magnesium stearate, calcium stearate, barium stearate and sodium palmitate, a lubricant such as mineral oil, liquid paraffin, stearic acid and ethylene-bis-stearamide, an anionic surface active agent such as carboxylate, sulfonate, sulfate and phosphate, a cationic surface active agent such as aliphatic amine salt, aliphatic quaternary ammonium salt, aromatic ammonium salt and heterocyclic ammonium salt, an amphoteric surface active agent such as betaine, aminocarboxylate and imidazoline derivatives, a nonionic surface active agent such as ether type surface active agent (e.g., alkylether, alkylallyl polyoxyethyleneether, polyoxyethylene polyoxypropyl alkyl ether), ether ester type surface active agent (e.g., glycerol ester polyoxyethlylene ether, sorbitan ester polyoxyethylene ether), ester type surface active agent (e.g., polyethylene glycol fatty acid ester, glycerin ester, propylene glycol ester, sucrose fatty acid ester) and nitrogen-containing type surface active agent (e.g., aliphatic alkanolamide, polyoxyethylene fatty acid amide, polyoxyethylene alkylamine, alkylamine oxide), a colorant such as titanium oxide and carbon black, or the like incorporated therein.

In order to enhance the heat resistance and stiffness of the lactic acid-based polyester, the lactic acid-based polyester may comprise an ordinary filler such as inorganic filler (e.g., talc, calcium carbonate, silica, clay, diatomaceous earth, perlite) and organic filler (e.g., wood flour, starch, cellulose, cellulose derivatives) incorporated therein. The amount of the filler to be added is not specifically limited. The filler is preferably added in an amount of from 0.5 to 50% based on the weight of the lactic acid-based polyester.

Further, an antioxidant, thermal stabilizer, ultraviolet absorber, antistatic material, flame retardant, wax, crystallization accelerator or the like may be added to the polymer before, during or after polymerization, during the devolatilizing process or the extrusion process after polymerization. The amount of such an additive to be added is preferably from 0.01% to 5% by weight.

Specific examples of the antioxidant include 2,6-ditbutyl-p-cresol, butylic hydroxyanisole, 2,6-di-tert-butyl-4-ethylphenol, distearyl-3,3-thiodipropionate, and dilauryl-3,3-thiodipropionate. Specific examples of the thermal stabilizer include triphenyl phosphite, trilauryl phosphite, and trisnonylphenyl phosphite. Specific examples of the ultraviolet absorber include p-t-butylphenyl salicylate, 2-hydroxy-4-methoxybenzophenone, 2-hydroxy-4-methoxy-2'-carboxybenzophenone, and 2,4,5-trihydroxybutyrophenone. Specific examples of the antistatic material include N,N-bis(hydroxyethyl)alkamine, alkyl amine, alkyl allyl sulfonate, and alkyl sulfonate. Specific examples of the flame retardant include hexabromocyclodedecane, tris-(2,3-dichloropropyl) phosphate, and pentabromophenylallyl ether.

Because of its excellent properties, the lactic acid-based polyester obtained according to the present invention can be used as a packaging material such as tray, foamed tray, stretched film, shrink film, drink bottle and blister for toothbrush, an agricultural and gardening material such as film for green house, tunnel film, multi-purpose film, vegetation sheet, seedling pot, string containing seed and fertilizer and agricultural chemical covering agent, a civil engineering material such as vegetation net made of flat yarn, heavy-duty bag, moulding box for construction, sheet for construction and lawn-stopping pile, a fishing material such as fishing net, laver-farming net, fishing line and fishing bait bag, sanitary goods such as paper diaper, sanitary goods packaging material and syringe, daily and sundry goods such as dust bag, vinyl bag, polyethylene bag, dish drainer net, binding tape, magnetic card, pen, marker, label, releasing paper, golf tee, grip of disposable razor, disposable dish, disposable spoon, disposable folk, paper lamination container, cosmetic bottle, shampoo bottle, rinse bottle, book cover and OHP film, a medical material such as joint material for bones, DDS material, stitching fiber and wound covering material, a water-retaining sheet, air-cleaning filter, vegetation sheet, tunnel sheet and weed-killing bag made of nonwoven fabric cloth, or the like.

The present invention will be further described in the following examples and comparative examples. The parts as used herein is by weight unless otherwise defined. The molecular weight, residual lactide, melting point, thermal stability and storage stability were measured by the following methods:

The molecular weight is measured by gel permeation chromatography (GPC) as calculated in terms of polystyrene standard. The residual lactide content was measured by high speed liquid chromatography. For the measurement of the melting point, a differential scanning type calorimeter DSC-200 available from Seiko Corp. The measurement of melting point was effected at a temperature rising rate of 10° C./min. The melting point was determined from the resulting melting-endothermal curve. For the measurement of the thermal stability, the specimen was allowed to stand at a temperature of 220° C. under a pressure of 5 torr for 30 minutes. The drop of weight and molecular weight was determined to evaluate the thermal stability. For the measurement of storage stability, the specimen was allowed to stand at a temperature of 35° C. and a humidity of 80% for 7 days. The drop of molecular weight was determined to evaluate storage stability.

For the biodegradability test, Type 100 Tombo Miracle Compo (100-1 composting container available from Shinki Gosei K. K.) was used. 50 kg of a garbage from the kitchen was put in the composting container. A 10 cm ×10 cm sheet specimen was then put on the garbage. Garbage was then accumulated on the specimen to a thickness of about 5 cm. The garbage was then sprinkled with 500 g of Newkusaminon (compost accelerant available from Aron Kasei Co., Ltd.). The arrangement was installed outdoors. After 1 month, the specimen was taken out. As a result, the specimen was found ragged to an extent such that the original shape was destroyed all in the examples and comparative examples. The test results were satisfactory.

EXAMPLE 1

To 5 parts of an aromatic polyester (terephthalic acid: 25 mol-%; isophthalic acid: 25 mol-%; ethylene glycol: 20 mol-%; neopentyl glycol: 30 mol-%; weight-average molecular weight: 55,400) were added 93 parts of L-lactide and 2 parts of D-lactide. The mixture was then melted and stirred at a temperature of 170° C. in an inert atmosphere for 1 hour. To the mixture were then added 0.04 parts of tin octanoate as an esterification catalyst.

The reaction mixture then underwent reaction at the same temperature for 6 hours. After the completion of the reaction, to the reaction system were then added 0.1 part of trinitrotriacetic acid and 0.1 part of triphenyl phosphite. The mixture was stirred for 20 minutes, and then taken out.

As a result of GPC, the lactic acid-based polyester thus obtained was found to have a single peak of molecular weight, demonstrating that it had been fully copolymerized. The lactic acid-based polyester showed a weight-average molecular weight of 168,000 and a residual lactide content of 3.9%.

The lactic acid-based polyester was devolalilized at a temperature of 200° C. under a pressure of 4 torr for 60 minutes, and then taken out. The lactic acid-based polyester thus devolatilized apparently looked light-yellowish and transparent and was odorless. The lactic acid-based polyester had a residual lactide content of not more than 0.1%. During this process, the lactic acid-based polyester showed little or no drop of molecular weight. Further, the lactic acid-based polyester showed a melting point of 168° C., a drop of not more than 1% in the weight and molecular weight after thermal stability test and a molecular weight drop of 1% after storage stability test. Thus, the lactic acid-based polyester thus obtained showed an excellent stability.

EXAMPLE 2

To 5 parts of an aliphatic polyester (succinic acid: 50 mol-%; ethylene glycol: 50 mol-%; weight-average molecular weight: 42,000) were added 95 parts of L-lactide and 15 parts of toluene as a solvent. The mixture was then melted and stirred at a temperature of 170° C. in an inert atmosphere for 1 hour. To the mixture were then added 0.03 part of tin octanoate as an esterification catalyst. The reaction mixture then underwent reaction at the same temperature for 6 hours.

After the completion of the reaction, to the reaction system were then added 0.05 part of tartaric acid. The mixture was stirred for 20 minutes, and then taken out. The lactic acid-based polyester thus obtained showed a weight-average molecular weight of 162,000 and a residual lactide content of 3.5%. The lactic acid-based polyester was devolatilized at a temperature of 200° C. under a pressure of 7 torr for 60 minutes to remove the volatile component therefrom. The lactic acid-based polyester thus devolatilized apparently looked colorless and was odorless. The lactic acid-based polyester had a residual lactide content of 0.1% and showed little or no molecular weight drop. The lactic acid-based polyester showed a melting point of 166° C., a drop of 1% in the weight and a drop of 2% in the molecular weight after thermal stability test and a molecular weight drop of 3% after storage stability test. Thus, the lactic acid-based polyester thus obtained showed an excellent stability.

EXAMPLE 3

To 40 parts of an aliphatic polyester (sebacic acid: 50 mol-%; propylene glycol: 50 mol-%; weight-average molecular weight: 38,000) were added 0.2 parts of pyromellitic anhydride. The mixture was then allowed to undergo reaction at a temperature of 210° C. for 3 hours. To the mixture were then added 56 parts of L-lactide, 4 parts of D-lactide and 15 parts of toluene as a solvent. The reaction mixture was then melted and stirred at a temperature of 170° C. in an atmosphere of inert gas for 1 hour. To the reaction system were then added 0.03 parts of tin octanoate as an esterification catalyst. The reaction mixture was then allowed to undergo reaction at a temperature of 175° C. for 6 hours.

After the completion of the reaction, to the reaction system was then added 0.1 part of ethylenediaminetetraacetic acid. The mixture was stirred for 20 minutes, and then taken out. The lactic acid-based polyester thus obtained showed a weight-average molecular weight of 123,000 and a residual lactide content of 3.6%. The lactic acid-based polyester was devolatilized at a temperature of 200° C. under a pressure of 5 torr for 60 minutes to remove the residual lactide therefrom. The lactic acid-based polyester thus devolatilized apparently looked light-yellowish and transparent and was odorless. The lactic acid-based polyester had a residual lactide content of not more than 0.1% and showed little or no molecular weight drop. The lactic acid-based polyester showed a melting point of 160° C., a drop of not more than 1% in the weight and the molecular weight after thermal stability test and a molecular weight drop of 1% after storage stability test. Thus, the lactic acid-based polyester thus obtained showed an excellent stability.

EXAMPLE 4

95 parts of L-lactide, 5 parts of D-lactide, and 15 parts of toluene as a solvent were mixed. The mixture was then melted and stirred at a temperature of 170° C. in an inert atmosphere for 1 hour. To the mixture were then added 0.03 part of tin octanoate as an esterification catalyst. The reaction mixture was then allowed to undergo reaction at a temperature of 175° C. for 6 hours.

After the completion of the reaction, to the reaction system were then added 0.15 part of transcyclohexanediaminetetraacetic acid. The mixture was stirred for 20 minutes, and then taken out. The polylactic acid thus obtained showed a weight-average molecular weight of 193,000 and a residual lactide content of 3.3%. The polylactic acid was devolatilized at a temperature of 200° C. under a pressure of 5 torr for 60 minutes to remove the volatile component therefrom. The polylactic acid thus devolatilized apparently looked light-yellowish and transparent and was odorless. The polylactic acid had a residual lactide content of not more than 0.1% and showed little or no molecular weight drop. The polylactic acid showed a melting point of 170° C., a drop of not more than 1% in the weight and the molecular weight after thermal stability test and a molecular weight drop of 1% after storage stability test. Thus, the polylactic acid thus obtained showed an excellent stability.

EXAMPLE 5

100 parts of 90% L-lactic acid were subjected to dehydration at a temperature of 150° C. under a pressure of 50 torr for 3 hours. To the material were then added 0.2 parts of tin powder. The mixture was then subjected to dehydration at the same temperature under a pressure of 30 torr for 2 hours. To the material were then added 350 parts of diphenylether as a solvent and 1 part of tin powder. The reaction mixture was then subjected to dehydrocondensation at a temperature of 130° C. under a pressure of 12 torr for 55 hours through a column filled with 100 parts of a molecular sieve arranged such that the solvent distilled away by refluxing flows back to the system therethrough.

After the completion of the reaction, to the reaction system were then added 1.5 parts of ethylenediaminetetraacetic acid. The mixture was stirred for 20 minutes, dissolved in chloroform, precipitated in methanol, filtered, and then dried to remove the solvent therefrom. The polylactic acid thus obtained showed a weight-average molecular weight of 111,000 and a residual lactide content of 3.3%. The polylactic acid was devolatilized at a temperature of 200° C. under a pressure of 5 torr for 60 minutes to remove the volatile component therefrom. The polylactic acid thus devolatilized apparently looked light-yellowish and transparent and was odorless. The polylactic acid had a residual lactide content of 0.1% and showed little or no molecular weight drop. The polylactic acid showed a melting point of 173° C., a drop of not more than 1% in the weight and the molecular weight after thermal stability test and a molecular weight drop of 2% after storage stability test. Thus, the polylactic acid thus obtained showed an excellent stability.

EXAMPLE 6

In this example, an arrangement comprising a reaction apparatus having a series combination of three 4-l liquid-filled type stirred reaction vessels equipped with a helical agitator blade, a ½ inch static mixer (Kenics type static mixer, manufactured by Noritake Co., Ltd.) as a heat exchanger and two devolatilizing tanks connected to each other was used. The starting material was supplied in the following manner. In some detail, lactide and an aliphatic polyester were supplied into a first reaction vessel in the form of a 15% toluene solution at a temperature of 110° C. in a nitrogen gas atmosphere using a plunger pump in such a manner that the average retention time of the starting material was 8 hours.

As a catalyst there was used tin octanoate. The catalyst was added before the first reaction vessel. As an organic chelating agent there was used t-butyl catechol. A line at which the organic chelating agent is added was provided immediately after a first devolatilizing apparatus. The supplied amount of the various components will be given below.

Starting material supply rate: 1.5 l/hr.

Catalyst supply rate: 0.5 ml/hr.

Chelating agent supply rate: 1.0 ml/hr.

The proportion of lactides and aliphatic polyester as starting materials will be given below.

L-lactide: 60%

D-lactide: 2%

Aliphatic polyester: 22%

Toluene: 16%

The polyester consists of 49 mol-% of dodecanedicarboxylic acid, 49 mol-% of dipropylene glycol and 2 mol-% of pyromellitic anhydride and has a weight-average molecular weight of 115,000. Tin octanonate as a catalyst was supplied in an amount of 0.04 part. The polymer thus produced was continuously taken out through the upper outlet of the final reaction tank by means of a gear pump.

The control temperature of the three reaction tanks used will be given below:

First reaction tank: 150° C.

Second reaction tank: 160° C.

Third reaction tank: 170° C.

Referring to the devolatilizing conditions, the temperature of the heat exchanger provided before the first devolatilizing tank was 200° C., and the pressure in the devolatilizing tank was 400 torr. The temperature of the heat exchanger provided before the second devolatilizing tank was 210° C., and the pressure in the devolatilizing tank was 1 torr. The material evaporated from the devolatilizing tank was recovered by a condenser.

The material recovered from the first devolatilizing tank comprised toluene in a proportion of about 100%. The toluene thus recovered could be dehydrated for recycling. The material recovered from the second devolatilizing tank mostly comprised lactide. Toluene was also identified in the material. The material was crystallized from toluene to recover lactide. The lactic acid-based polyester thus obtained was pelletized, and then evaluated for properties.

The pellet looked light-yellowish and transparent and was odorless. The product had a weight-average molecular weight of 163,000 and showed a residual lactide content of 0.2%. No toluene was confirmed. The product showed a melting point of 159° C. The product showed a drop of 2% each in the weight and molecular weight after thermal stability test. Further, the product showed a molecular weight drop of 4% after storage stability test.

EXAMPLE 7

To 35 parts of an aliphatic polyester (methylsuccinic acid: 49 mol-%; maleic anhydride: 1 mol-%; dipropylene glycol component: 50 mol-%; weight-average molecular weight: 43,000) was added 0.1 part of trimellitic anhydride. The mixture was then allowed to undergo reaction at a temperature of 210° C. with stirring for 3 hours. As a result, a polymer having a weight-average molecular weight of 94,000 was obtained. To the polymer were then added 61 parts of L-lactide and 4 parts of D-lactide. The mixture was then melted and stirred at a temperature of 170° C. in an atmosphere of inert gas for 1 hour. The reaction mixture was then allowed to undergo reaction at a temperature of 175° C. in the presence of 0.04 part of tin octanoate as an esterification catalyst for 6 hours.

After the completion of the reaction, 0.1 part of citric acid was added to the reaction system. The mixture was then stirred for 20 minutes. The reaction product was then taken out from the reaction vessel at the lower portion in the form of strand by means of a gear pump. The reaction product thus taken out was then pelletized. The lactic acid-based polyester thus obtained had a weight-average molecular weight of 154,000 and showed a residual lactide content of 4.6%.

The lactic acid-based polyester thus obtained was then subjected to devolatilization under a pressure of 4 torr at an outlet temperature of 210° C. using a thin film type devolatilizer to remove residual lactide therefrom. The lactic acid-based polyester thus treated looked colorless and transparent and was odorless. The product had a weight-average molecular weight of 146,000 and a residual actide content of 0.3%. The product showed a melting point of 159° C. The product showed a weight drop of 1% and a molecular weight drop of 2% after thermal stability test. Further, the product showed a molecular weight drop of 3% after storage stability test.

EXAMPLE 8

To 20 parts of an aliphatic polyester (sebacic acid: 50 mol-%; polypropylene glycol: 45 mol-%; propylene glycol: 5 mol-%; weight-average molecular weight: 43,000) was added 0.1 part of hexamethylene diisocyanate. The mixture was then allowed to undergo reaction at a temperature of 130° C. with stirring for 3 hours. As a result, a polymer having a weight-average molecular weight of 97,000 was obtained. To the polymer were then added 78 parts of L-lactide and 2 parts of D-lactide. The mixture was then melted and stirred at a temperature of 165° C. in an atmosphere in which the air within had been replaced by an inert gas for 1 hour. The reaction mixture was then allowed to undergo reaction at a temperature of 170° C. in the presence of 0.03 parts of tin octanoate as an esterification catalyst for 6 hours.

After the completion of the reaction, 0.1 part of triethylenetetraminehexaacetic acid was added to the reaction system. The mixture was stirred for 20 minutes, and then taken out. The lactic acid-based polyester thus obtained had a weight-average molecular weight of 155,000 and showed a residual lactide content of 4.2%. The lactic acid-based polyester reaction solution thus obtained was then continuously introduced into a biaxial extruder with four vents by means of a gear pump. In this manner, the reaction solution was subjected to devolatilization under a pressure of 2 torr at an output of 10 kg/hr, a cylinder temperature of 185° C. and a screw rotary speed of 200 rpm. The lactic acid-based polyester thus obtained had a weight-average molecular weight of 147,000 and a residual lactide content of not more than 0.1%. The product showed a melting point of 163° C. The product showed a drop of not more than 1% each in the weight and molecular weight after thermal stability test. Further, the product showed a molecular weight drop of 2% after storage stability test.

EXAMPLE 9

To 30 parts of an aliphatic polyester (adipic acid: 50 mol-%; 1,6-hexanediol: 50 mol-%; weight-average molecular weight: 45,000) was added 0.15 part of Epiclon-4400. The mixture was then allowed to undergo reaction at a temperature of 200° C. with stirring for 3 hours. As a result, a polymer having a weight-average molecular weight of 125,000 was obtained. To the polymer were then added 64 parts of L-lactide and 6 parts of DL-lactide. The mixture was then melted and stirred at a temperature of 165° C. in an atmosphere in which the air within had been replaced by an inert gas for 1 hour. The reaction mixture was then allowed to undergo reaction at a temperature of 170° C. in the presence of 0.03 part of tin octanoate as an esterification catalyst for 6 hours.

After the completion of the reaction, 0.1 part of diethylenetetraminepentaacetic acid was added to the reaction system. The mixture was stirred for 20 minutes, pelletized, and then taken out. The lactic acid-based polyester pellet thus obtained had a weight-average molecular weight of 155,000 and showed a residual lactide content of 4.2%. The lactic acid-based polyester pellet thus obtained was absolutely dried, and then extruded from a vented monoaxial extruder with L/D of 30 and an extruding screw diameter of 50 mm to obtain a 1.0-mm thick light-yellowish odorless sheet having good surface conditions.

The extrusion was effected at a cylinder temperature of 170° C., a screw rotary speed of 20 rpm and an output of 5 kg/hr under a pressure of 1 torr obtained by suction through the vent. The sheet thus obtained had a weight-average molecular weight of 143,000 and a residual lactide content of 0.3%. The product showed a melting point of 159° C. The product showed a drop of not more than 1% each in the weight and molecular weight after thermal stability test. Further, the product showed a molecular weight drop of 2% after storage stability test.

COMPARATIVE EXAMPLE 1

The procedure of Example 3 was followed to synthesize a lactic acid-based polyester which was then devolatilized except that no organic chelating agent was added. The lactic acid-based polyester thus obtained apparently looked brown and transparent and was malodorous. The product had a weight-average molecular weight of 97,000 and a residual lactide content of 3.3%. The product showed a melting point of 153° C. The product showed a drop of 18% in the weight and a drop of 16% in the molecular weight after thermal stability test. Further, the product showed a molecular weight drop of 26% after storage stability test. Thus, the product had a deteriorated stability.

COMPARATIVE EXAMPLE 2

The procedure of Example 9 was followed to prepare a lactic acid-based polyester sheet except that no organic chelating agent was added. The sheet thus obtained apparently looked yellowish brown, gave out an offensive smell and showed deteriorated surface conditions. The product had a weight-average molecular weight of 112,000 and a residual lactide content of 3.5%. The product showed a melting point of 152° C. The product showed a drop of 17% each in the weight and the molecular weight after thermal stability test. Further, the product showed a molecular weight drop of 28% after storage stability test. Thus, the sheet product leaves something to be desired. Moreover, lactide was found to be attached to the dice of the monoaxial extruder.

In the present invention, an organic chelating agent is added to a lactic acid-based polyester to deactivate the esterification catalyst used in the preparation of the lactic acid-based polyester, making it possible to inhibit the decomposition of lactic acid-based polyester at the devolatilizing process and molding process after polymerization reaction. Accordingly, a process for the preparation of a lactic acid-based polyester useful as a packaging material such as film and sheet having a high molecular weight, a high heat resistance, good mechanical properties and excellent moldability, storage stability and biodegradability can be provided.

While the invention has been described in detail and with reference to specific embodiments thereof, it will be apparent to one skilled in the art that various changes and modifications can be made therein without departing from the spirit and scope thereof.

What is claimed is:

1. A process for the preparation of a lactic acid-based polyester, which comprises melt-kneading a lactic acid-based polyester with an organic chelating agent, wherein said lactic acid-based polyester comprises a lactic acid component and a polyester consisting of a dicarboxylic acid component and a diol component in a weight proportion of from 99/1 to 10/90 and said organic chelating agent is at least one member selected from the group consisting of carboxylic acids including a coordinated N atom and hydroxycarboxylic acids.

2. The process for the preparation of a lactic acid-based polyester according to claim 1, wherein said organic chelating agent is used in an amount of from 0.001 to 5 parts by weight based on 100 parts by weight of the lactic acid-based polyester used.

3. The process for the preparation of a lactic acid-based polyester according to claim 1, wherein said polyester consisting of a dicarboxylic acid component and a diol component is an aliphatic polyester.

4. The process for the preparation of a lactic acid-based polyester according to claim 2, wherein said polyester consisting of a dicarboxylic acid component and a diol component is an aliphatic polyester.

5. The process for the preparation of a lactic acid-based polyester according to claim 1, which comprises melt-kneading a lactic acid-based polyester with an organic chelating agent, and then removing volatile components by devolatilization under reduced pressure.

6. The process for the preparation of a lactic acid-based polyester according to claim 2, which comprises melt-kneading a lactic acid-based polyester with an organic chelating agent, and then removing volatile components by devolatilization under reduced pressure.

7. The process for the preparation of a lactic acid-based polyester according to claim 3, which comprises melt-kneading a lactic acid-based polyester with an organic chelating agent, and then removing volatile components by devolatilization under reduced pressure.

8. The process for the preparation of a lactic acid-based polyester according to claim 4, which comprises melt-kneading a lactic acid-based polyester with an organic chelating agent, and then removing volatile components by devolatilization under reduced pressure.

9. A molding process of a lactic acid-based polyester, which comprises adding an organic chelating agent to a lactic acid-based polyester, and then molding the mixture wherein said lactic acid-based polyester comprises a lactic acid component and a polyester consisting of a dicarboxylic acid component and a diol component in a weight proportion of from 99/1 to 10/90 and said organic chelating agent is at least one member selected from the group consisting of carboxylic acids including a coordinated N atom and hydroxycarboxylic acids.

10. The molding process of a lactic acid-based polyester according to claim 9, wherein said organic chelating agent is used in an amount of from 0.001 to 5 parts by weight based on 100 parts by weight of the lactic acid-based polyester used.

11. The process for the preparation of a lactic acid-based polyester according to claim 1, wherein said carboxylic acids are nitrilotriacetic acid, ethylenediaminediacetic acid, tetraethylenepentamine, hydroxyethylenediaminetriacetic acid, ethylenediaminetetraacetic acid, trans-cyclohexanediaminetetraacetic acid, diethylenetriaminepentaacetic acid and triethylenetetraminehexaacetic acid.

12. The process for the preparation of a lactic acid-based polyester according to claim 1, wherein said hydroxycarboxylic acids are tartaric acid, dibenzoyl-D-tartaric acid, di-p-toluoyl-D-tartaric acid, citric acid and monooctyl citrate.

13. The process for the preparation of a lactic acid-based polyester according to claim 5 wherein said carboxylic acids are nitrilotriacetic acid, ethylenediaminediacetic acid, tetraethylenepentamine, hydroxyethylenediaminetriacetic acid, ethylenediaminetetraacetic acid, trans-cyclohexanediaminetetraacetic acid, diethylenetriaminepentaacetic acid and triethylenetetraminehexaacetic acid.

14. The process for the preparation of a lactic acid-based polyester according to claim 5 wherein said hydroxycarboxylic acids are tartaric acid, dibenzoyl-D-tartaric acid, di-p-toluoyl-D-tartaric acid, citric acid and monooctyl citrate.

15. The process for the preparation of a lactic acid-based polyester according to claim 6, wherein said carboxylic acids are nitrilotriacetic acid, ethylenediaminediacetic acid, tetraethylenepentamine, hydroxyethylenediaminetriacetic acid, ethylenediaminetetraacetic acid, trans-cyclohexanediaminetetraacetic acid, diethylenetriaminepentaacetic acid and triethylenetetraminehexaacetic acid.

16. The process for the preparation of a lactic acid-based polyester according to claim 6, wherein said hydroxycarboxylic acids are tartaric acid, dibenzoyl-D-tartaric acid, di-p-toluoyl-D-tartaric acid, citric acid and monooctyl citrate.

17. The process for the preparation of a lactic acid-based polyester according to claim 7, wherein said carboxylic acids are nitrilotriacetic acid, ethylenediaminediacetic acid, tetraethylenepentamine, hydroxyethylenediaminetriacetic acid, ethylenediaminetetraacetic acid, trans-cyclohexanediaminetetraacetic acid, diethylenetriaminepentaacetic acid and triethylenetetraminehexaacetic acid.

18. The process for the preparation of a lactic acid-based polyester according to claim 7, wherein said hydroxycarboxylic acids are tartaric acid, dibenzoyl-D-tartaric acid, di-p-toluoyl-D-tartaric acid, citric acid and monooctyl citrate.

19. The process for the preparation of a lactic acid-based polyester according to claim 8, wherein said carboxylic acids are nitrilotriacetic acid, ethylenediaminediacetic acid, tetraethylenepentamine, hydroxyethylenediaminetriacetic acid, ethylenediaminetetraacetic acid, trans-cyclohexanediaminetetraacetic acid, diethylenetriaminepentaacetic acid and triethylenetetraminehexaacetic acid.

20. The process for the preparation of a lactic acid-based polyester according to claim 8, wherein said hydroxycarboxylic acids are tartaric acid, dibenzoyl-D-tartaric acid, di-p-toluoyl-D-tartaric acid, citric acid and monooctyl citrate.

21. The process for the preparation of a lactic acid-based polyester according to claim 9, wherein said carboxylic acids are nitrilotriacetic acid, ethylenediaminediacetic acid, tetraethylenepentamine, hydroxyethylenediaminetriacetic acid, ethylenediaminetetraacetic acid, trans-cyclohexanediaminetetraacetic acid, diethylenetriaminepentaacetic acid and triethylenetetraminehexaacetic acid.

22. The process for the preparation of a lactic acid-based polyester according to claim 9, wherein said hydroxycarboxylic acids are tartaric acid, dibenzoyl-D-tartaric acid, di-p-toluoyl-D-tartaric acid, citric acid and monooctyl citrate.

\* \* \* \* \*